Nov. 14, 1967 M. J. P. AUPOIX 3,352,321

FLEXIBLE GATE DEVICE PRESSURE LOCK ARRANGEMENT USING SAME

Filed Nov. 14, 1963 2 Sheets-Sheet 1

INVENTOR
M. J. P. Aupoix
By Holcomb, Wetherill & Brisebois
ATTORNEYS

FLEXIBLE GATE DEVICE PRESSURE LOCK ARRANGEMENT USING SAME

Filed Nov. 14, 1963 2 Sheets-Sheet 2

INVENTOR
M. J. P. Aupoix
By Holcomb, Wetherill & Brisebois
ATTORNEYS

United States Patent Office 3,352,321

Patented Nov. 14, 1967

3,352,321

FLEXIBLE GATE DEVICE PRESSURE LOCK ARRANGEMENT USING SAME

Marcel J. P. Aupoix, Paris, France, assignor to Societe Generale du Vide, Choisy-le-Roi, Seine, France, a corporation of France Filed Nov. 14, 1963, Ser. No. 323,788
Claims priority, application France, Nov. 27, 1962, 916,727, Patent 1,348,508; Dec. 6, 1962, 917,736, Patent 83,216
2 Claims. (Cl. 137—613)

This invention relates to an improved construction of flexible gates or valves, and to a pressure lock arrangement embodying a pair of such improved flexible gates. The invention has especial utility in connection with the pressure lock systems used for the introduction and withdrawal of articles into and out of treating enclosures containing a treating atmosphere at sub- or super-atmospheric pressure, in cases where the articles being treated are of relatively wide, flat, configuration, such as sheets, strips and the like. Thus, in the processing of animal hides in the leather and related industries, the hides must be dried in a rarefied atmosphere. Considerable difficulties have been encountered heretofore in order to provide suitable pressure lock arrangements whereby the hides might be introduced into and removed from such drying enclosures without causing a loss of vacuum in the enclosure that would be obviously detrimental to the economy of the process.

Objects of this invention include the provision of an improved pressure lock system for the insertion and removal of wide flat articles into and from a treating enclosure while minimizing the resulting changes in pressure and other characteristics of a controlled atmosphere in the enclosure; the provision of improved flexible valve or gate means, and pressure lock systems embodying same, which will be simple and economical to construct, operate and maintain, will require low power to operate between open and closed conditions, will be robust and long-lived, will provide a highly effective seal when closed, and will be especially well-adapted for the transfer of broad flat articles of sheet-like character therethrough.

The above and further objects of the invention as well as the novel features thereof will become apparent as the disclosure proceeds. Exemplary embodiments of the invention will now be described for purposes of illustration but not of limitation with reference to the accompanying diagrammatic drawings wherein.

Broadly described, a valve or gate device according to the invention comprises an elongated band- or strip-like element made from a flexibly deformable material and formed into a continuous loop having two generally straight parallel spaced sides interconnected at their ends so as to define within the loop an elongated slot-like aperture. A pair of rigid members are engageable with the outer surfaces of the said sides of the looped element, and are relatively displaceable towards and away from each other, so as either to bring the sides of the loop into mutual contact engagement at their inner surfaces to close said aperture, or to separate said sides and open the aperture.

Figure 1:
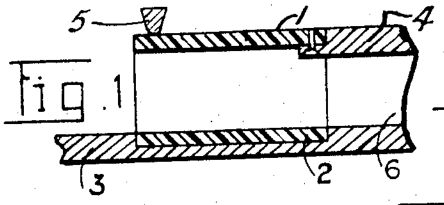
FIG. 1 is a view of a flexible valve or gate device according to the invention in section on a vertical plane normal to the main dimension of the elongated gate aperture, and showing the gate in open condition.
Figure 5:
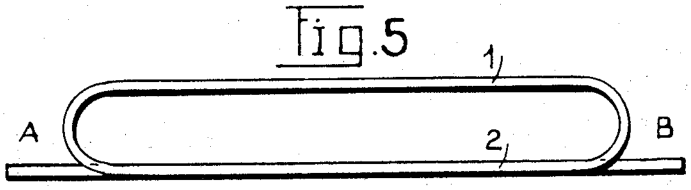
FIG. 5 is an elevational view taken on the same plane as FIG. 3 and showing the flexible gate member separately.

Referring now to the drawings, FIG. 5 illustrates the looped band-like element having the parallel spaced straight sides 1 and 2 continuously interconnected at their ends by the arcuate parts A and B. The band element may be made from any suitable material having adequate flexibility and resiliency together with mechanical strength and wear resistance. Natural and synthetic rubber compositions and various other elastomers and synthetic polymer sheet material may be used. The looped element is so dimensioned as to define within it an elongated slot-like aperture commensurate with the transverse dimensions of the articles to be transferred through the gate device. FIG. 1 shows in section on a plane at right angles to the plane of FIG. 5 the same looped element 1–2 secured at the extremity of a conduit 6 having generally corresponding transverse dimensions to the aperture in the loop. One of the straight sides of the element, e.g. the lower side 2, is fixedly secured in a recess formed in an extension of the corresponding wall 3 of conduit 6, so that the inner or upper surface of side 2 lies flush with the inner or upper surface of the conduit wall 3. The other, upper, side 1 of the element has one edge suitably secured, e.g. pinned or bonded, to the marginal edge of the upper wall 4 of the conduit 6 so that the side 1 projects freely therefrom. The projecting length and the thickness of the looped element are so dimensioned with regard to the flexibility and resiliency characteristics of the material from which the element is made that the side 1 is supported substantially in a horizontal plane as shown, while remaining sufficiently flexible to be deformed in the the manner presently described.

Figure 2:
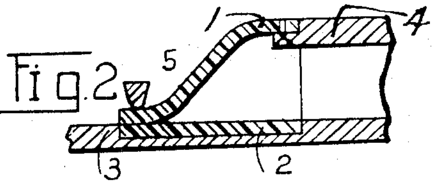
FIG. 2 is a similar view showing the gate in closed condition.
Figure 3:
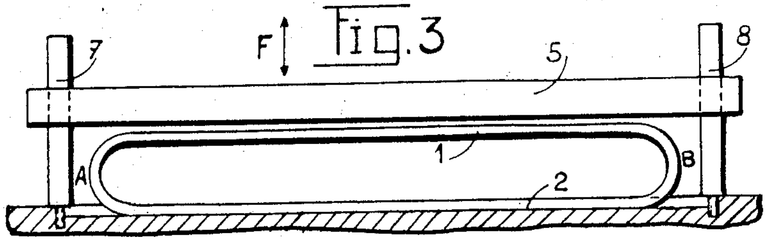
FIG. 3 is an elevational view of the same device in the open condition, as seen on the arrow III of FIG. 1.
Figure 4:
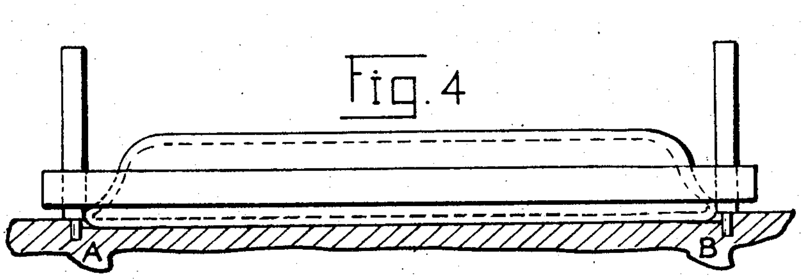
FIG. 4 is a similar view of the gate device closed, as seen on the arrow IV of FIG. 2.

A gate actuating member is provided in the form of a straight, rigid bar 5 extending transversely across the conduit 6 above the free end region of the side 1. Bar 5 is supported for parallel up and down displacement through any suitable means schematically indicated in FIG. 3 as comprising a pair of laterally positioned guide posts 7 and 8, such displacements of bar 5 being indicated by the arrows F. When bar 5 is displaced downward from its upper position shown in FIGS. 1 and 3 it deforms the upper side 1 of the flexible element to engage it tightly against the lower side 2 as shown in FIGS. 2 and 4, thus sealing the aperture of the gate device.

Figure 6:
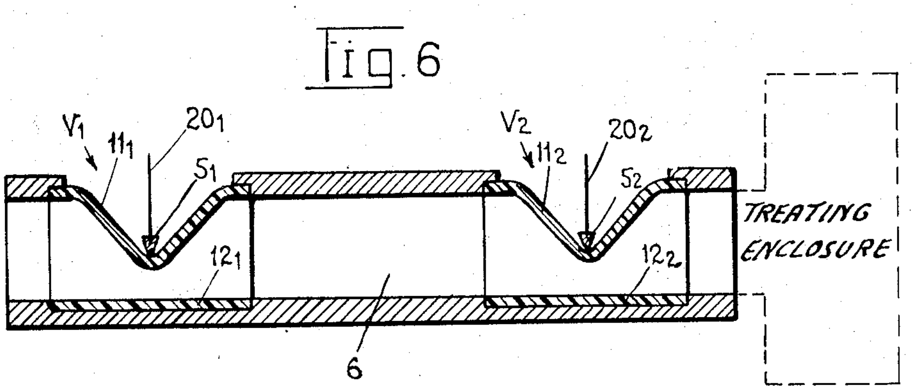
FIG. 6 is a view of a pressure-lock system according to the invention embodying two flexible gate devices each device of the type shown in the following FIGURES 7–10, said view being taken on a vertical plane at right angles to the major dimension of the elongated gate apertures, and showing both gate devices in their intermediate conditions.

It will be readily understood that when a pair of valve or gate devices of the general type just described are arranged in series in a conduit, a pressure lock arrangement may be provided for transferring transversely-elongated flat articles into and from an enclosure at controlled pressure. This aspect of the invention is illustrated in FIG. 6 and will be later described. First a preferred modification of the gate device above described with reference to FIGS. 1–5 will be disclosed with reference to FIGS. 7–10 since the lock system of the invention preferably makes use of the said modification.

Figure 7:
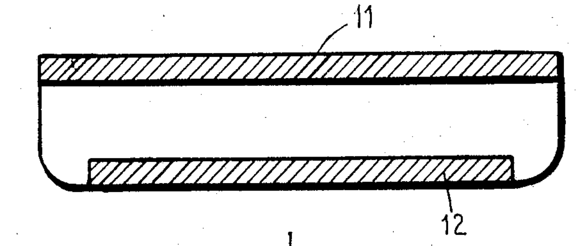
FIG. 7 is a sectional view of a preferred form of flexible gate member for use in a gate device of the general type shown in FIGS. 1–5, the section being on a plane at right angles to the major dimension of the elongated gate aperture and the flexible member being shown in its free, undeformed condition prior to mounting.
Figure 8:
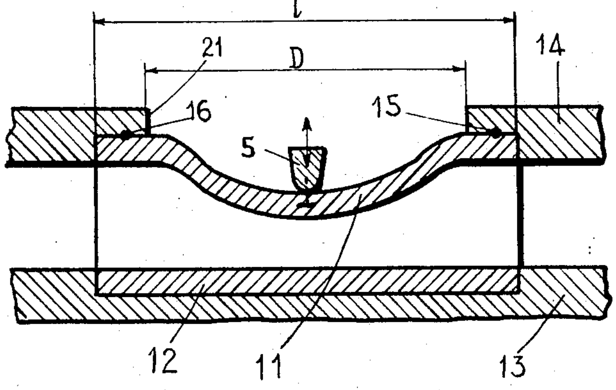
FIG. 8 is a similar sectional view of a flexible gate device using the preferred form of gate member shown in FIG. 7, shown in its intermediate position.
Figures 9, 10:
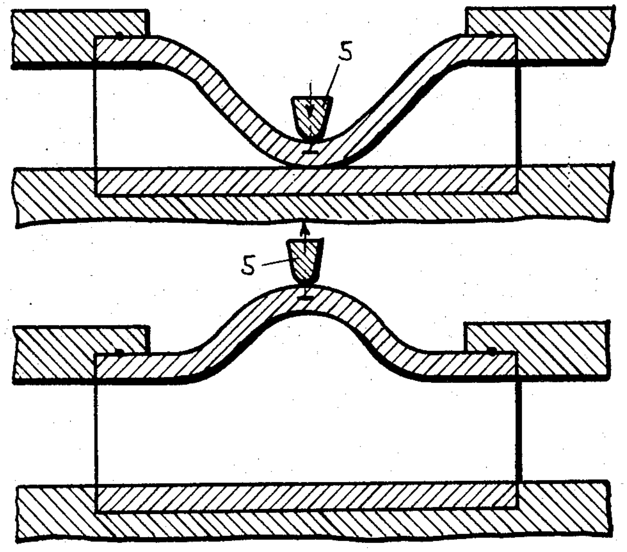
FIG. 9 is similar to FIG. 8 but shows the gate device in sealing position.
FIG. 10 is a similar view showing the gate device in its fully open position.

Referring to FIG. 7, in the modification here considered the looped flexible band has its two parallel sides, here designated 11 and 12, of unequal width in the free undeformed state, with the upper side 11 being wider than the lower side 12. The two portions of unequal width may preferably merge with one another gradually in the connecting end portions such as A and B (FIG. 5) of the loop, as will be readily understood without further illustration. In the present modification the flexible valve element is adapted to have its upper side supported at both ends rather than from just one end as in the first embodiment described. Referring to FIG. 8, the lower side 12 of the loop is shown embedded in a recess of a lower conduit wall 13 so as have its upper surface flush with the upper surface of said wall. The upper side 11 has its opposite ends bonded as at 15 and 16 to rebates formed in the under surface of the upper wall 14 of the conduit, along the opposite walls or edges of an aperture 22 cut out in said upper conduit wall. The spacing of the rebates and bonding areas 15 and 16 is such that the wider upper side 11 of the loop is constrained to flex, as indicated, so that when the upper side 11 of the looped element is in a neutral unstressed state said side 11 sags to an intermediate position, as shown, in which the gate aperture is open to an intermediate extent. In this form of the invention the actuator bar 5 is connected by suitable means to the deformable upper side 11 of the looped element, and can be selectively moved to a lower position in which the side 11 is engaging the under side 12 as shown in FIG. 9, so that the gate is sealed, or raised to an upper position as in FIG. 10, wherein the gate is fully open. Preferably the width "D" of the cutout 22 in the conduit wall 14 and the distance between the rebates to either side of said cutout are so dimensioned that the total distance "1" between the side edges of the upper side 11 of the element, when in its mounted position, equals the width of the lower side 12. In the neutral or rest position shown in FIG. 8 the upper side 11 is substantially free from any stresses, and only a minimum amount of force is necessary to deflect the side 11 from such neutral position, to either its sealing position (FIG. 9) or to its fully open position (FIG. 10). Also, friction and other stresses involved in the operation of the device between its end positions is reduced to a minimum.

Referring now to FIG. 6, a lock system according to the invention is shown as comprising a conduit 6 assumed to be connected at its right-hand end with an enclosure, schematically shown, such as a vacuum drying chamber. Disposed in series relation in the conduit are two valve or gate devices respectively designated V1 and V2 according to the invention. Gate devices V1 and V2 are here shown as being each similar to the embodiment shown in FIGS. 7–10. The components of the respective devices V1 and V2 are designated with the same references as those of the respectively corresponding components in the device heretofore described (FIGS. 7–10), followed by subscripts 1 or 2. The outer gate device V1 is constructed and arranged in a manner substantially identical with the device shown in FIGS. 7–10 near the outer end of conduit 6. The inner gate device V2 is constructed and arranged in a manner substantially identical with the device shown in FIGS. 7–10 at an intermediate point of conduit 6. The actuator bars $\mathbf{5}_1$, $\mathbf{5}_2$, of the respective gate devices are independently operable by means of rods $\mathbf{20}_1$, $\mathbf{20}_2$ between their raised and lowered positions to displace the corresponding lock gates V1 and V2 independently from the neutral position shown to either their open or their sealing positions. It will be understood that the spacing between the adjacent ends of the respective gate devices V1 and V2 longitudinally of the conduit 6 is provided large enough to enable the articles being processed to be received in the intervening space when both lock gates are closed. Interlock means may be provided between the operating means for both actuator rods $\mathbf{20}_1$, $\mathbf{20}_2$ to prevent their being simultaneously displaced to their gate-opening positions in normal operation.

Conveniently, in a vacuum drying or other treating installation using the lock means of the invention, there may be provided a separate inlet lock system and an outlet lock system connected with opposite sides of the drying or other treating chamber, each system being similar to the one shown in FIG. 6 for a continuous transfer of the articles into, through, and out of the treating chamber.

It will be apparent that various modifications may be introduced into the embodiments of the invention shown and described by way of example herein without exceeding the scope of the invention. Thus, the lock system may include two flexible gate devices both similar to the device disclosed with reference to FIGS. 1–5, or it may include flexible gate devices one of which is similar to the device shown in FIGS. 1–5 and the other to that of FIGS. 7–10. When using a device of the type shown in FIGS. 1–5, it may be necessary to position the actuator 5 entirely within the conduit, and suitable means, such as one or more rods extending slidably through the upper conduit wall 4 in sealing relation therewith, may then be provided for operating such actuating bar.

I claim:

1. The combination with a treating enclosure for animal skins and the like large flat articles of a gate device for transferring said articles between said enclosure and the exterior, said gate device comprising: a conduit in the form of a flat tube having one end connected to said enclosure, and having an elongated cross section with dimensions corresponding to those of said articles for freely passing said articles through the conduit in flat conditions; said conduit having at least one tubular section interposed in an intermediate region of said conduit spaced from both ends thereof and comprising a flexible broad sidewall portion deformable into tight sealing engagement with an opposite broad sidewall portion to seal said conduit; and actuator means engageable with an outer surface of said flexible broad sidewall portion along a line generally transverse of the conduit for deforming it into engagement with said opposite broad sidewall portion and sealing the conduit, said one broad sidewall portion of the flexible conduit section having an undeformed dimension as measured longitudinally of the conduit which is substantially greater than the corresponding dimension of said opposite broad sidewall of the conduit section, and means connecting the respective ends of said one broad sidewall portion to said conduit so as to place said one broad sidewall of the conduit section under longitudinal compression so that it is normally deflected and thereby reduce the force required to bring it into sealing engagement with said opposite broad sidewall portion by said actuator means.

2. The combination claimed in claim 1, in which said conduit has two flexible broad sidewall portions spaced longitudinally thereof and each deformable into tight sealing engagement with a related opposite broad sidewall portion of the conduit to seal said conduit; the longitudinal spacing between said flexible sidewall portions being greater than a length dimension of any one of said articles whereby at least one article can be positioned within the conduit between said flexible sidewall portions; and in which said actuator means is selectively and simultaneously engageable with an outer surface of each of said flexible broad sidewall portions along a line generally transverse of the conduit for deforming it into engagement with the related opposite sidewall portion and sealing the conduit.

(Other references on following page)

References Cited

UNITED STATES PATENTS

| | | | |
|---|---|---|---|
| 1,024,876 | 4/1912 | Barbour | 251—8 |
| 2,533,264 | 12/1950 | Jurs | 251—8 |
| 2,692,707 | 10/1954 | Maxwell | 251—5 |
| 2,990,154 | 6/1961 | Hoff | 251—7 |

FOREIGN PATENTS

| | | |
|---|---|---|
| 110,107 | 2/1928 | Austria. |
| 994,887 | 11/1951 | France. |

WILLIAM F. O'DEA, *Primary Examiner.*

H. COHN, *Assistant Examiner.*